United States Patent
van Riel

(10) Patent No.: US 9,280,486 B2
(45) Date of Patent: Mar. 8, 2016

(54) MANAGING MEMORY PAGES BASED ON FREE PAGE HINTS

(75) Inventor: Henri Han van Riel, Nashua (NL)

(73) Assignee: Red Hat, Inc., Raleigh, NC (US)

( * ) Notice: Subject to any disclaimer, the term of this patent is extended or adjusted under 35 U.S.C. 154(b) by 977 days.

(21) Appl. No.: 13/193,549

(22) Filed: Jul. 28, 2011

(65) Prior Publication Data

US 2013/0031292 A1 Jan. 31, 2013

(51) Int. Cl.
G06F 12/10 (2006.01)
G06F 9/455 (2006.01)

(52) U.S. Cl.
CPC ............ *G06F 12/10* (2013.01); *G06F 9/45533* (2013.01); *G06F 2009/45583* (2013.01)

(58) Field of Classification Search
None
See application file for complete search history.

(56) References Cited

U.S. PATENT DOCUMENTS

| 2007/0016904 A1* | 1/2007 | Adlung | G06F 9/5016 718/1 |
| 2009/0307447 A1* | 12/2009 | Jacobs et al. | 711/162 |
| 2010/0070678 A1* | 3/2010 | Zhang et al. | 711/6 |

OTHER PUBLICATIONS

Riel, Rik van. "Re: [patch: 0/6] Guest page hinting". Posted Mar. 27, 2009. <https://lkml.org/lkml/2009/3/27/503> and <https://lkml.org/lkml/2009/3/27/503> in thread <https://lkml.org/lkml/2009/3/27/223>.*

Corbet. "Guest page hinting". Posted Sep. 6, 2006. <http://lwn.net/Articles/198380/>. Comment posted by rvdheij on Sep. 14, 2006.*

Waldspurger, C.A., "Memory Resource Management in VMware ESX Server," *Proceedings of the 5th Symposium on Operating Systems Design and Implementation*, Boston, Massachusetts, Dec. 9-11, 2002, 15 pages.

Scwidefsky, M. et al., "Collaborative Memory Management in Hosted Linux Environments," (IBM), *Linux Symposium*, Ottawa, Canada, Jul. 19-22, 2006, 16 pages.

Van Riel, R., "KVM Performance Optimizations Internals," *The Red Hat Summit*, Boston, Massachusetts, May 5, 2011, 25 pages.

Corbet, J., "Linux Filesystem, Storage, and Memory Management Summit, Day 2," *2011 Linux Filesystem, Storage and Memory Management Summit*, San Francisco, California, Apr. 5, 2011, 9 pages.

"The Role of Memory in VMware ESX Server 3—Information Guide," VMware, Inc. Sep. 26, 2006, 11 pages.

Schwidefsky, M., "Linux Kernel Archive: [patch 0/6] [rfc] guest page hinting version 5" (May 11, 2007), downloaded on Jul. 28, 2011 from http://lkml.indiana.edu/hypermail/linux/kernel/0705.1/2101html, 2 pages.

Schwidefsky, M., "Linux Kernel Archive: [patch 1/6] Guest page hinting: core + volatile page cache," (Jun. 28, 2007), downloaded on Jul. 28, 2011 from http://comments.gmane.org/gmane.comp.emulators.kvm.devel/4314, 1 page.

(Continued)

*Primary Examiner* — Charles Rones
*Assistant Examiner* — Hewy Li
(74) *Attorney, Agent, or Firm* — Lowenstein Sandler LLP

(57) ABSTRACT

A host selects a memory page that has been allocated to a guest for eviction. The host may be a host machine that hosts a plurality of virtual machines. The host accesses a bitmap maintained by the guest to determine a state of a bit in the bitmap associated with the memory page. The host determines whether content of the memory page is to be preserved based on the state of the bit. In response to determining that the content of the memory page is not to be preserved, the host discards the content of the memory page.

20 Claims, 9 Drawing Sheets

(56) References Cited

OTHER PUBLICATIONS

Schwidefsky, M., "Linux Kernel Archive: [patch 2/6] Guest page hinting," (May 11, 2007), downloaded on Jul. 28, 2011 from http://lkml.indiana.edu/hypermail/linux/kerne1/0705.1/2100html, 8 pages.

Schwidefsky, M., "Linux Kernel Archive: [patch 3/6] Guest page hinting: mlocked pages," (May 11, 2007), downloaded on Jul. 28, 2011 from http://lkml.indiana.edu/hypermail/linux/kerne1/0705.1/2102html, 3 pages.

Schwidefsky, M., "Linux Kernel Archive: [patch 4/6] Guest page hinting: writable page table entries," (May 11, 2007), downloaded on Jul. 28, 2011 from http://lkml.indiana.edu/hypermail/linux/kerne1/0705.1/2104html, 7 pages.

Schwidefsky, M., "Linux Kernel Archive: [patch 5/6] Guest page hinting: minor fault optimization," (May 11, 2007), downloaded on Jul. 28, 2011 from http://lkml.indiana.edu/hypermail/linux/kerne1/0705.1/2103html, 5 pages.

Schwidefsky, M., "Linux Kernel Archive: [patch 6/6] Guest page hinting: s390 support," (May 11, 2007), downloaded on Jul. 28, 2011 from http://lkml.indiana.edu/hypermail/linux/kerne1/0705.1/2105html, 14 pages.

* cited by examiner

MANAGING MEMORY PAGES BASED ON FREE PAGE HINTS

TECHNICAL FIELD

Embodiments of the present invention relate to memory management and, more specifically, to the management of over-committed memory shared by multiple processes and/or virtual machines.

BACKGROUND

Virtualization allows multiplexing of an underlying host machine between different virtual machines. The host machine allocates a certain amount of its resources to each of the virtual machines. Each virtual machine is then able to use the allocated resources to execute applications, including operating systems (referred to as guest operating systems). A software layer that provides the virtualization is commonly referred to as a hypervisor (also known as a virtual machine monitor (VMM)). The hypervisor emulates the underlying hardware of the host computer, making the use of the virtual machine transparent to the guest operating system and the user of the computer.

A host machine can accommodate more virtual machines than the size of its physical memory allows. Using virtual memory techniques, the host machine can give each virtual machine the impression that it has a contiguous address space, while in fact the memory used by the virtual machine may be physically fragmented and even overflow to disk storage. When the host machine needs to free up memory, it selects memory pages that have been assigned to virtual machines, and pages out the contents of those memory pages to secondary storage. When the virtual machines attempt to access those memory pages, the host machine then pages in the contents of the memory page by reading the contents that have been stored in the secondary storage and writing those contents back to memory. Paging out and paging in memory pages requires input/output (I/O) operations, which can cause significant delay for the virtual machine.

International Business Machines (IBM®) has developed a processor architecture (called System z machine architecture) that includes hardware support for special Extract and Set Storage Attributes (ESSA) instructions between the host machine and virtual machines regarding the state of memory pages assigned to those virtual machines. Using the ESSA instructions, IBM's system z machines improve the performance of memory management by identifying memory pages whose contents do not need to be preserved, thereby eliminating disk I/Os during memory eviction. However, IBM's system z machines rely on hardware support for this functionality. There is no similar hardware or software support for such memory management optimization in other processor architectures, such as x86 processor architectures.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for optimizing memory management in a shared memory environment. In one embodiment, a host machine hosts multiple virtual machines, each of which may include a guest operating system. The host machine selects a memory page that has been allocated to a virtual machine for eviction. The host machine accesses a bitmap maintained by the virtual machine to determine a state of a bit in the bitmap associated with the memory page. This bitmap may be maintained by a guest memory manager running on the virtual machine. The host machine determines whether content of the memory page is to be preserved based on the state of the bit. For example, if the bit is not set (0), then the host machine may determine that the content is to be preserved. Alternatively, if the bit is set (1), then the host machine may determine that the content is not to be preserved. In response to determining that the content of the memory page is not to be preserved, the host machine discards the content of the memory page rather than performing an I/O operation to store the content to secondary storage. This can reduce an amount of time that is used to perform the eviction from about 5-10 milliseconds (the time to perform a disk access) to about 10-50 nano seconds (the time to perform a memory access) or a few thousand processor cycles. The embodiments of the present invention improve the efficiency of memory management in a virtualized environment, while ensuring that the data inside of memory pages that are in use remains stable and preserved.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
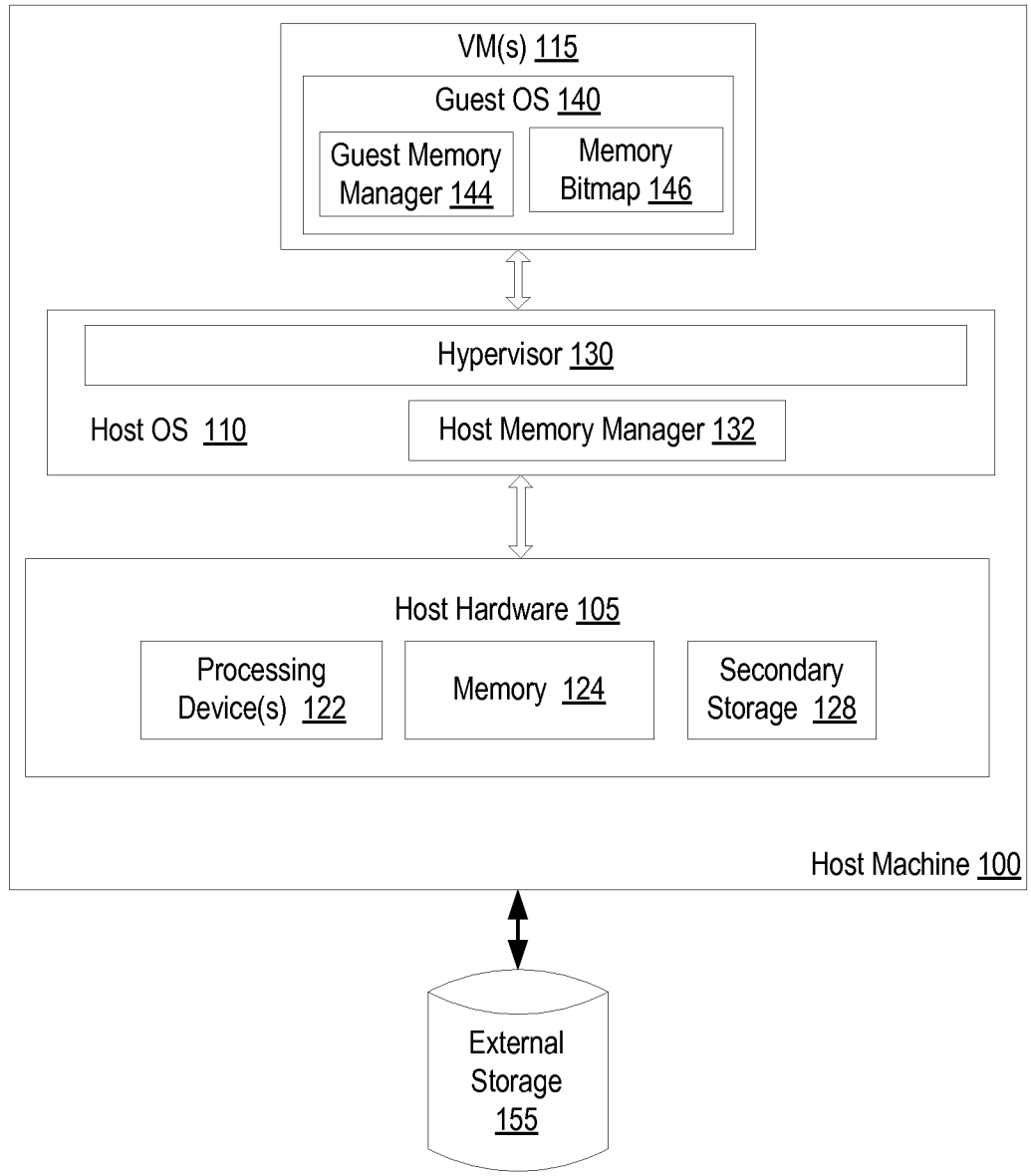
FIG. 1 is a block diagram that illustrates an embodiment of a computer system that hosts one or more virtual machines.

FIG. 1 is a block diagram that illustrates an embodiment of a computer system (referred to herein as a host machine 100) that hosts one or more virtual machines (VMs) 115. The host machine 100 may be a rackmount server, a workstation, a desktop computer, a notebook computer, a tablet computer, a mobile phone, a palm-sized computing device, a personal digital assistant (PDA), etc. In one embodiment, the host machine 100 is a computing device implemented with x86 hardware. The host machine 100 includes host hardware 105, which may include one or more processing devices 122, memory 124, secondary storage 128, and other hardware components (e.g., I/O devices). The memory 124 may include volatile memory devices (e.g., random access memory (RAM)), non-volatile memory devices (e.g., flash memory), and/or other types of memory devices. The secondary storage 128 may include mass storage devices, such as magnetic or optical storage based disks, tapes or hard drives. The host hardware 105 may also be coupled to external storage 155 via a direct connection or a local network. The host machine 100 may be a single machine or multiple host machines arranged in a cluster.

The host machine 100 includes a hypervisor 130 (also known as a virtual machine monitor (VMM)). In one embodiment (as shown) hypervisor 130 is a component of a host operating system 110. Alternatively, the hypervisor 130 may run on top of a host OS 110, or may run directly on host hardware 105 without the use of a host OS 110.

The hypervisor 130 manages system resources, including access to memory 124, I/O devices and secondary storage 128. The hypervisor 130, though typically implemented in software, may emulate and export a bare machine interface (host hardware 105) to higher level software. Such higher level software may comprise a standard or real-time operating system (OS), may be a highly stripped down operating environment with limited operating system functionality, may not include traditional OS facilities, etc. The hypervisor 130 presents to other software (i.e., "guest" software) the abstraction of one or more virtual machines (VMs) 115, which may provide the same or different abstractions to various guest software (e.g., guest operating system, guest applications, etc.).

The host machine 100 hosts any number of virtual machines (VM) 115 (e.g., a single VM, one hundred VMs, etc.). A virtual machine 115 is a combination of guest software that uses an underlying emulation of the host machine 100 (e.g., as provided by hypervisor 130). The guest software may include a guest operating system 140, guest applications, guest device drivers, etc. Virtual machines 115 can be, for example, hardware emulation, full virtualization, para-virtualization, and operating system-level virtualization virtual machines. The virtual machines 115 may have the same or different guest operating systems 140, such as Microsoft® Windows®, Linux®, Solaris®, etc.

Each guest OS 140 includes a guest memory manager 144 (also known as a memory allocator). The guest memory manager 144 allocates memory to processes, applications, etc. running within the VM 115 on which the guest OS 140 runs. The guest memory manager 144 allocates memory using memory pages, which are contiguous blocks of virtual memory (e.g., a 4K-byte block of memory). These memory pages may be allocated to the VM 115 by a host memory manager 132 (described below). In one embodiment, the guest memory manager 144 and the host memory manager 132 are kernel level processes.

The guest memory manager 144 maintains a memory bitmap 146 that indicates a state of each memory page that has been allocated to the VM 115. Each VM 115 may have a separate bitmap maintained by a guest memory manager 144 running in that VM. In one embodiment, each memory page allocated to a VM is represented by a single bit in the memory bitmap 146. Alternatively, each memory page may be represented by multiple bits in the bitmap 146.

In one embodiment, in which each memory page is represented as a single bit, a set bit (1) indicates that an associated memory page is free (not allocated) and an unset bit (0) indicates that the associated memory page is in use (allocated). Alternatively, a set bit may indicate that a memory page is allocated, and an unset bit may indicate that the memory page is free. If a memory page is free, then the content of that memory page does not need to be preserved (e.g., when the memory page is swapped out or swapped in). If a memory page is allocated (in use), then the content of the memory page should be preserved. In one embodiment, the guest maintains the memory bitmap 146. However, in one embodiment it is the host (or the hypervisor 130) that performs actions based on the bitmap 146, either preserving or discarding a memory page's contents based on the state of a bit in the bitmap 146.

Each time a state of a memory page changes, guest memory manager 144 updates the memory bitmap 146 to show the updated state. For example, when a memory page is allocated, the guest memory manager 144 may clear a bit associated with that memory page. Similarly, when the memory page is freed, the guest memory manager 144 may set the bit associated with the memory page. The bit may be set/cleared before the memory page is freed/allocated, concurrent to the memory page being freed/allocated, or after the memory page is freed/allocated. In one embodiment, the bit for a memory page is not immediately updated after the memory page is allocated. Instead, the bit may remain set (indicating that the contents of the memory page do not need to be preserved) until the process/application to which the memory page is assigned actually uses the memory page. Once the process/application attempts to write to the memory page, then the bit for that memory page in the memory bitmap 220 may be freed.

In one embodiment, the guest memory manager 144 touches the memory page (accesses at least one byte of physical memory mapped to the memory page) before allocating the memory page. Touching the memory page may trigger a page fault if the memory page has been swapped out (also referred to as paged out) to secondary storage 128 by a host memory manager 132. A page fault is raised when a program or a process (e.g., a program or process running in a virtual machine) attempts to access a memory page that is mapped in an address space of a process or operating system, but is not resident in physical memory. Paging out (or swapping out) a memory page is the act of copying the contents of a memory page to secondary storage 128 and removing those contents from physical memory that was mapped to the memory page. Paging in (or swapping in) a memory page is the act of writing the contents of a memory page from secondary storage to physical memory and mapping that physical memory to a process's or operating system's address space.

In one embodiment, the host OS 110 includes a host memory manager 132 that manages virtual memory used by the virtual machines 115. The host memory manager 132 may also be a component of the hypervisor 130. Host memory manager 132 allocates memory to each VM 115. This may include over-committing the actual available physical memory 124. For example, the host machine 100 may include 8 GB of RAM. However, the host memory manager 132 may allocate 2 GB of RAM to five different VMs 115.

In one embodiment, host memory manager 132 performs de-duplication of memory pages. Host memory manager 132 may scan memory pages and compare the contents of different memory pages. If two memory pages are found to have the same contents, then the contents of the duplicate memory page may be discarded.

To enable over-commitment of memory 124, host memory manager 132 may create a swap space in secondary storage 128 and/or external storage 155. When physical memory is needed by a VM 115 or by the host OS 110, the host memory manager 132 selects memory pages that have been allocated to another VM 115 and swaps out those memory pages into the swap space (stores the content of the memory pages in the swap space). When the VM 115 attempts to access a memory page that has been swapped out, a page fault is generated. In response to the page fault, host memory manager 132 may perform an I/O operation to read the contents of the memory page from the swap space, and may write the contents to a physical memory page. The VM 115 can then complete the access to the memory page.

In some instances, the memory page contents that are to be swapped out to the swap space are unused by the VM 115. In such instances, the I/O operations that would be performed to write the contents of the memory page to secondary storage 128 and the I/O operations that would be performed to later read the contents from the secondary storage 128 are unnecessary. Accordingly, in one embodiment, host memory manager 132 accesses a memory bitmap 146 maintained by guest memory manager 144 when a memory page is to be paged out (swapped out). If the bit in the memory bitmap 146 corresponding to the memory page is set, then the host memory manager 132 may discard the contents of the memory page rather than storing those contents in the swap space. This prevents one or more unnecessary I/O operations and additionally saves swap space.

In one embodiment, host memory manager 132 accesses the memory bitmap 146 maintained by guest memory manager 144 when a memory page is to be swapped in. The guest memory manager 144 may have freed the memory page after the memory page was swapped out. In such instances, swapping in the memory page would be a wasted effort, as the guest memory manager 144 would immediately discard the swapped in contents. At swap-in time, if the bit associated with the memory page that is to be swapped in is set, then instead of swapping in the memory page, a new memory page is allocated. The contents of the memory page that were swapped out may be discarded.

In an example, a guest (e.g., a guest OS 140, a VM 115, a guest application, etc.) may have a memory page that has not been accessed in a while, and which has been swapped out by the host memory manager 132. When the guest needs the memory for something new, it may recycle the memory page. This would entail freeing the memory page, setting a bit in the bitmap corresponding to the memory page, and then allocating the memory page to another process/application. This means that there is a period of time in which the content of the memory page that is stored in the swap space can be discarded (because the old content of the memory page will no longer be used). In one embodiment, before the guest memory manager 144 allocates the freed memory page, the guest memory manager 144 touches the memory page, which causes a page fault. Touching the memory page may be a part of the memory allocation process performed by the guest memory manager 144. At this time, the host memory manager 132 sees that the memory page has been freed by the guest, and discards the contents of the memory page and allocates a new memory page (e.g., allocates new memory that doesn't have any information in it) to the guest. Therefore, an unnecessary disk I/O operation is prevented, saving time and resources.

In one embodiment, the host memory manager 132 takes steps to avoid race conditions (in which the result of an operation is unexpectedly and critically dependent on a sequence or timing of other events). It may be desirable for the host memory manager 132 to ensure that, before discarding the contents of a memory page, that memory page is still unused (e.g., that a process has not started using the memory page after the host memory manager 132 decided that it was safe to discard the contents of the memory page but before the host memory manager 132 actually did discard the memory page). Accordingly, in one embodiment, the host memory manager 132 checks the memory bitmap twice before the contents of a memory page are discarded. This ensures that the contents of presumably unused memory pages can be discarded without suffering from a simultaneous re-allocation of the memory pages.

The host memory manager 132 first checks the memory bitmap to make an initial determination that the memory page is free. If the memory page is free, the host memory manager 132 unmaps the memory page (causes the memory page to no longer be associated with (mapped to) physical memory). After unmapping the memory page, the host memory manager 132 again checks the bitmap to ensure that the memory page is still free. If the bit associated with the memory page was cleared before the memory page was unmapped, this may indicate that new contents that should be preserved may have been written to the memory page (and thus are stored in the physical memory that was previously mapped to that memory page). Accordingly, if the bit is not set on the second check of the memory page, then the host memory manager 132 maps the memory page back to the physical memory it was previously mapped to. If the unused bit is still set, then the host memory manager 132 discards the contents of the memory page (e.g., maps the physical memory previously mapped to the memory page to a new memory page without first saving the contents of the physical memory).

In one embodiment, each memory page allocated to a VM is represented by two bits in the memory bitmap 146, 150. The bits associated with a memory page may have the states 00, 01, 10 or 11. In one embodiment, a 00 indicates that a memory page is assigned (stable), a 01 indicates that a memory page is free, a 11 indicates that a memory page should be made stable on swap-in or left stable if already in memory and a 10 indicates that a page should be made stable on swap-in or left stable if already in memory. However, other conventions may be used.

While a memory page is free, it may have a state of 01. In one embodiment, when the memory page is allocated, a guest clears the first bit and sets the second bit, transitioning from a state of 01 to a state of 10. When the page is later freed, the guest clears the second bit and again sets the first bit, transitioning from a state of 10 to a state of 01. In such an embodiment, the host may discard contents of memory pages for which the first bit is set (e.g., 01). Additionally, the host may preserve the contents of memory pages for which the first bit is clear (e.g., 10 or 00). For example, if a swap-in happens on a page with the second bit set (e.g., 10), the host knows that it can discard the contents of the memory page that have been swapped out to secondary storage. Instead of swapping in the stored contents of the memory page, the host may assign a fresh memory page. The host may then clear the second bit, causing the state of the bits associated with the memory page to transition from 10 to 00. If a memory page for which the first bit is clear is selected for swap-out, then the host may swap out the contents to secondary storage. If a memory page is selected for swap-out for which the first bit is set, the contents of the page may be discarded. Note that in this embodiment, the host memory manager can see that the memory page has been reused or will be reused based on the memory bitmap 146. Accordingly, in one embodiment, the guest memory manager 144 does not touch the memory page at memory allocation time.

In another embodiment, when the memory page is allocated, the guest sets the second bit, causing the state of the bits representing that memory page to transition from 01 to 11. When a page fault is generated (e.g., when a new process/application that was assigned the memory page attempts to use the memory page), the host memory manager 132 checks the memory bitmap to determine a state of the memory page. If the state of the memory page is 01, then the host memory manager 132 may discard the contents of the memory page and assign a new memory page. If the state of the memory page is 11 or 00, then the host memory manager 132 preserves content of the memory page. If the state of the bits is 11, then the host additionally clears both bits associated with that memory page, transitioning the bits from 11 to 00.

In one embodiment, in which two bits are used per memory page in the memory bitmap 146, the host memory manager 132 may make modifications to the memory bitmap 146. For example, the host memory manager 132 may scan the memory bitmap 146 to identify a memory page that can be discarded and/or a memory page that can be evicted. On finding such a memory page, the host memory manager 132 may make the identified memory page stable, and modify the memory bitmap 146 to reflect this. Additionally, the host memory manager 132 may receive a page fault for a memory page that was previously evicted (e.g., swapped out to secondary storage 128). If the contents of the memory page do not need to be preserved, then the host memory manager 132 may allocate a new memory page and make the new memory page stable by modifying (e.g., clearing) a corresponding bit or bits in the memory bitmap 146. To avoid race conditions, host memory manager 132 may perform a lock on the memory page and/or the memory bitmap 146. In one embodiment, host memory manager 132 uses compare and exchange instructions to avoid race conditions.

Figure 2:
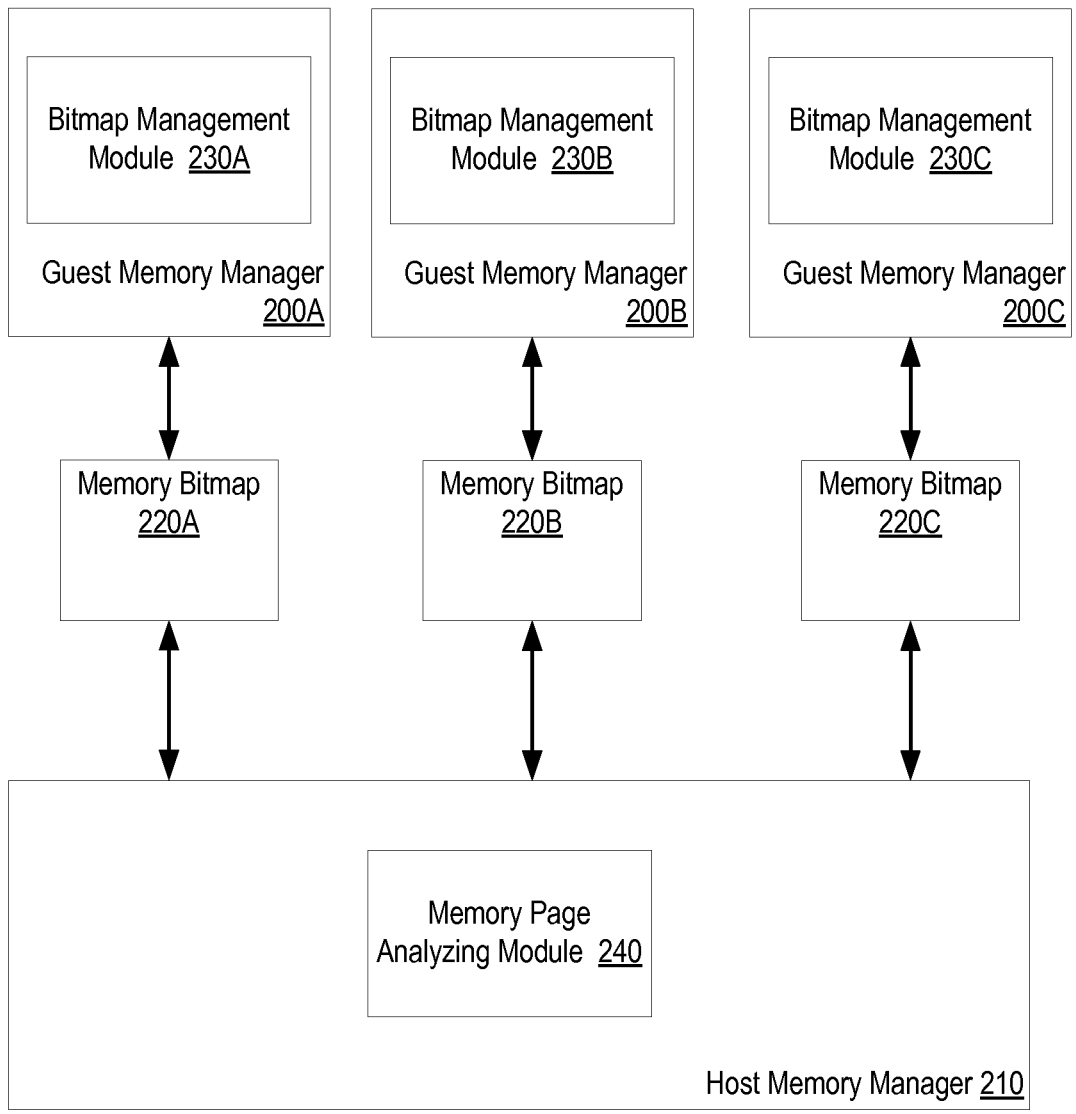
FIG. 2 is a block diagram showing information exchange between a host memory manager and multiple guest memory managers, in accordance with one embodiment of present invention.

FIG. 2 is a block diagram showing information exchange between a host memory manager 210 and multiple guest memory managers 200A-200C, in accordance with one embodiment of present invention. As described with reference to FIG. 1, each guest memory manager 200A-200C runs within a virtual machine. Guest memory managers 200A-200C can communicate the state of memory pages allocated to the VM on which they run by maintaining memory bitmaps 220A-220C. This communication of memory page status information between a guest and host can reduce or eliminate unnecessary swap operations, and thus optimize system performance.

Note that though three guest memory managers 200A-200C are shown, host memory manager 210 may communicate with any number of guest memory managers 200A-200C via memory bitmaps 220A-220C. In one embodiment, guest memory managers 200A-200C include bitmap management modules 230A-230C that maintain the memory bitmaps 220A-220C. This may include generating and registering the memory bitmaps, and setting and clearing bits of the memory bitmaps as memory pages are allocated and/or freed.

In one embodiment, bitmap management modules 230A-230C generate the memory bitmaps 220 in designated locations such as a designated memory locations or designated registers. In one embodiment, bitmap management modules 230A-230C register the memory bitmaps 220A-220C using system calls. The designated memory locations or designated registers may be known to and/or accessible by both a guest memory manager 200A-200C and the host memory manager 210. Therefore, host memory manager 210 may access the memory bitmaps 220A-220C before performing memory operations such as allocating memory, freeing memory, swapping out memory, swapping in memory, etc. However, the host memory manager 210 may refrain from checking the memory bitmaps 220A-220C until memory is to be freed. Therefore, any additional overhead of managing memory pages will be reduced to simply setting a bit when a memory page is freed and clearing the bit when the memory page is allocated.

In one embodiment, host memory manager 210 includes a memory page analyzing module 240. Memory page analyzing module 240 may be responsible for checking the memory bitmaps 220A-220C. Memory page analyzing module 240 may additionally recommend particular memory pages of one or more VMs for memory operations (e.g., for eviction) based on one or more memory bitmaps 220A-220C. When host memory manager 210 determines that memory needs to be freed, memory page analyzing module 240 may scan the memory bitmaps 220A-220C to determine which VMs to revoke memory from and which particular memory pages to reclaim from those VMs (which memory pages to evict). Additionally, or in the alternative, the memory page analyzing module 240 may scan through page frames to identify pages to evict. If the host memory manager 210 needs to free up swap space, memory page analyzing module 240 may search for swapped out memory pages that have been freed. This may involve scanning the swap space to identify swapped out memory pages and checking the statuses of the swapped out memory pages in the memory bitmaps 220.

When memory pages are to be evicted, memory page analyzing module 240 identifies whether contents of the memory pages need to be preserved based on the memory bitmaps 220A-220C. If the contents are to be preserved, then host memory manager 210 swaps out the memory pages to a swap space. If the contents of the memory pages are not to be preserved, host memory manager 210 simply discards the contents of the memory pages. Similarly, when memory pages are to be swapped in, memory page analyzing module 240 reviews an appropriate bitmap to determine whether the contents of the swapped out memory page can be discarded. If the contents cannot be discarded, the host memory manager 210 swaps in the memory page. If the contents can be discarded, the host memory manager 210 allocates a new memory page and removes the contents from the swap space.

Figure 3:
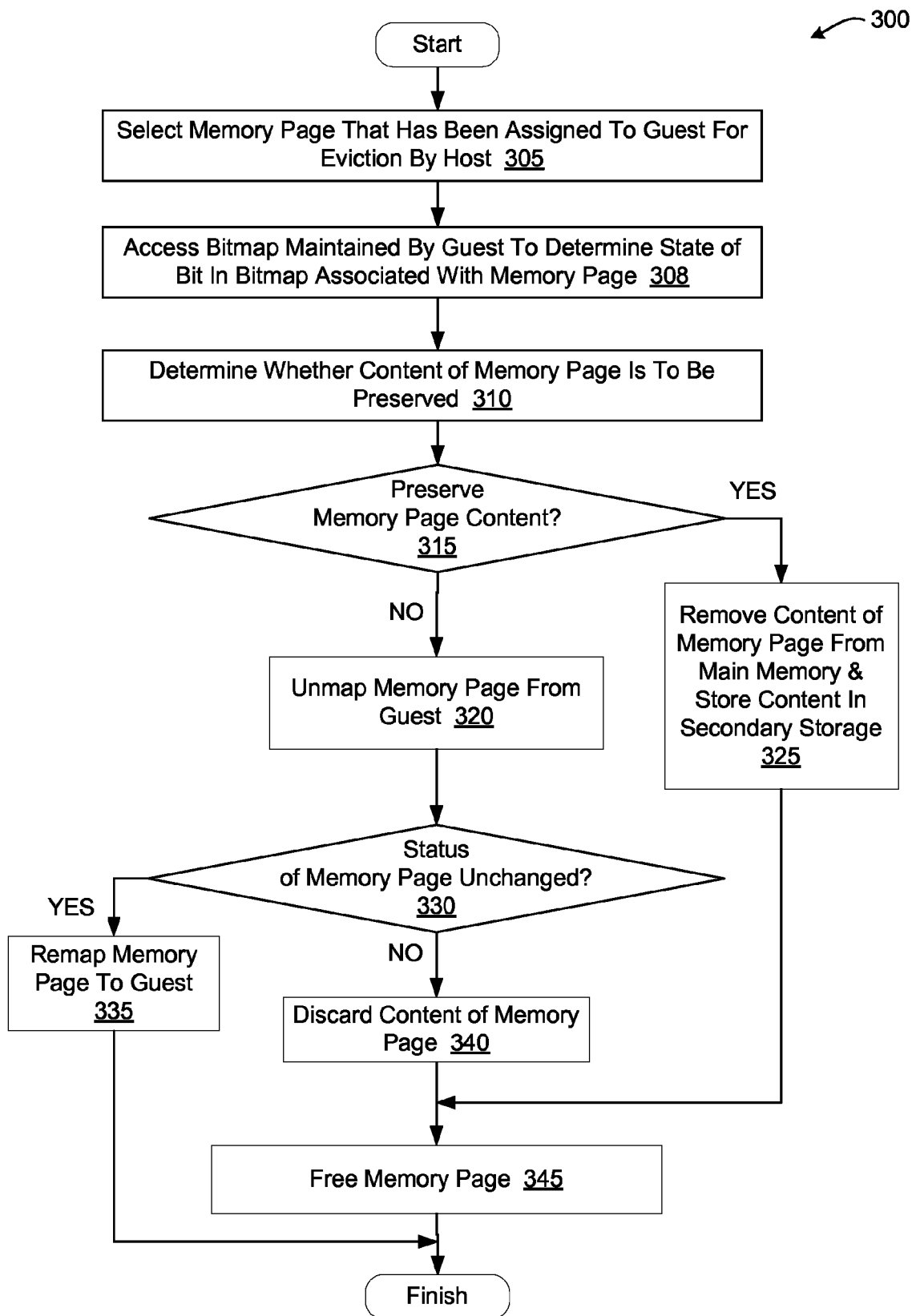
FIG. 3 is a flow diagram illustrating one embodiment of a method for performing memory eviction.

FIG. 3 is a flow diagram illustrating one embodiment of a method 300 for performing memory eviction. The method 300 may be performed by a computer system that may comprise hardware (e.g., circuitry, dedicated logic, programmable logic, microcode, etc.), software (e.g., instructions run on a processing device to perform hardware simulation), or a combination thereof. In one embodiment, the method 300 is performed by the host memory manager 132 of FIG. 1.

Referring to FIG. 3, at block 305 of method 300, a host (e.g., a host memory manager) selects a memory page that has been allocated to a guest for eviction (e.g., to be swapped out). At block 308, the host accesses a bitmap maintained by a guest (e.g., by a guest memory manager) to determine a state of a bit in the bitmap associated with the memory page.

At block 310, the host determines whether the content of the memory page is to be preserved based on the bitmap. In one embodiment, the content of the memory page is to be preserved if the bit corresponding to the memory page is unset (0), and the content of the memory page is not to be preserved if the bit is set (1). At block 315, if the memory page content is to be preserved, the method continues to block 325. However, if the memory page content is not to be preserved, the method proceeds to block 320.

At block 325, the host swaps out or pages out the memory page (removes the content of the memory page from main memory and stores the content in secondary storage). The method then proceeds to block 345.

At block 320, the host unmaps the memory page from the guest. At block 330, the host accesses the bitmap a second time to determine whether the status of the memory page has changed (e.g., whether the bit associated with the memory page is still set). If the state of the memory page is unchanged, the method continues to block 340 and the contents of the memory page are discarded. If the status of the memory page has changed, this indicates that the memory page was reallocated (and potentially used) after the original check of the bitmap, and before the memory page was unmapped. Accordingly, if the status of the memory page has changed (e.g., bit is no longer set), the method proceeds to block 335 and the memory page is remapped to the guest.

At block 345, the host frees the memory page. The host may then reassign the memory page to a new guest or to a process of the host. The method then ends.

Figure 4:
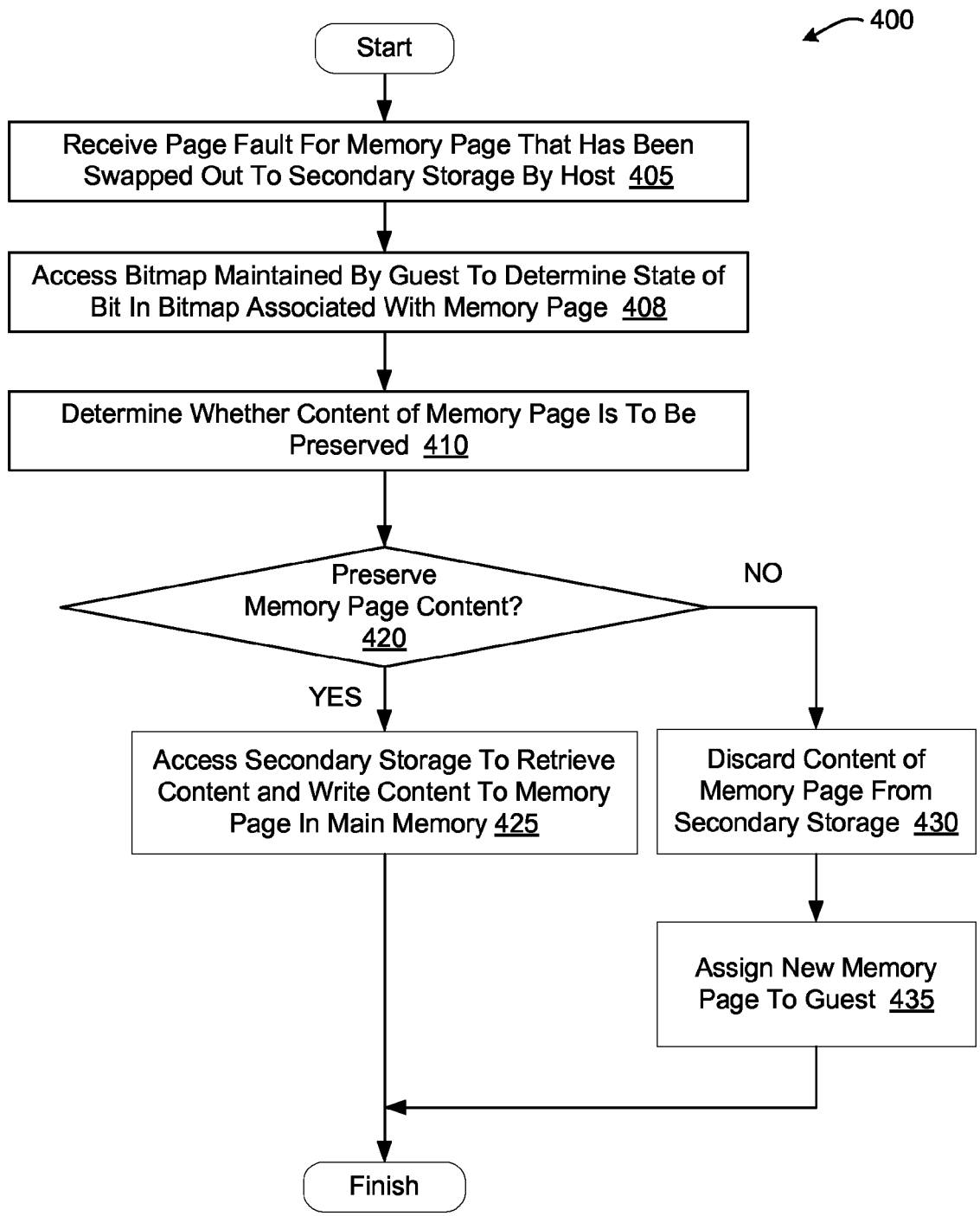
FIG. 4 is a flow diagram illustrating one embodiment of a method for handling a page fault.

FIG. 4 is a flow diagram illustrating one embodiment of a method 400 for handling a page fault. The method 400 may be performed by a computer system that may comprise hardware (e.g., circuitry, dedicated logic, programmable logic, microcode, etc.), software (e.g., instructions run on a processing device to perform hardware simulation), or a combination thereof. In one embodiment, the method 400 is performed by the host memory manager 132 of FIG. 1.

Referring to FIG. 4, at block 405 of method 400, a host receives a page fault for a memory page that has been swapped out to secondary storage. The page fault may be raised by computer hardware in response to a currently running program in a guest that is trying to access a non-resident page in its address space. At block 408, the host accesses a bitmap maintained by the guest to determine a state of a bit in the bitmap associated with the memory page.

At block 410, the host determines whether the content of the memory page is to be preserved based on the bitmap. In one embodiment, the content of the memory page is to be preserved if the bit corresponding to the memory page is unset (0), and the content of the memory page is not to be preserved if the bit is set (1). At block 420, if the memory page content is to be preserved, the method continues to block 425. However, if the memory page content is not to be preserved, the method proceeds to block 430.

At block 425, the host swaps in the memory page (accesses the secondary storage to retrieve content and writes the content to a region of main memory and maps the main memory region to the memory page).

At block 430, the host discards the content of the memory page that was stored in swap space in the secondary storage. At block 435, the host assigns a new memory page to the guest. The method then ends.

Figure 5:
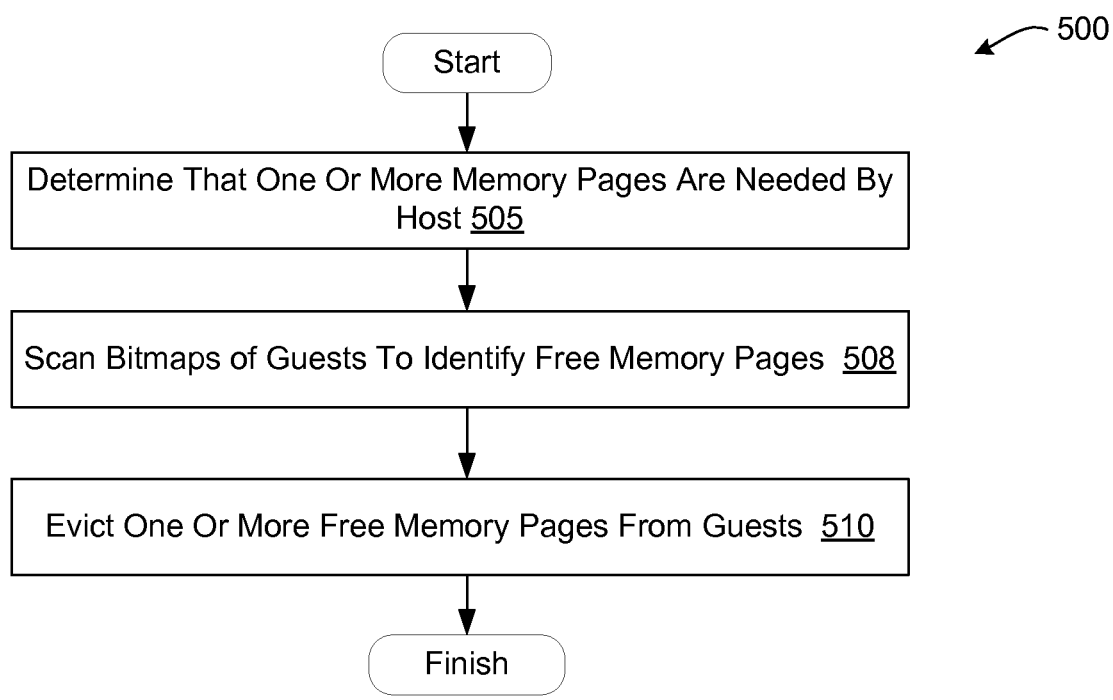
FIG. 5 is a flow diagram illustrating one embodiment of a method for identifying memory pages that are candidates for eviction.

FIG. 5 is a flow diagram illustrating one embodiment of a method 500 for identifying memory pages that are candidates for eviction. The method 500 may be performed by a computer system that may comprise hardware (e.g., circuitry, dedicated logic, programmable logic, microcode, etc.), software (e.g., instructions run on a processing device to perform hardware simulation), or a combination thereof. In one embodiment, the method 500 is performed by the host memory manager 132 of FIG. 1.

Referring to FIG. 5, at block 505 of method 500, a host determines that one or more memory pages are needed. At block 508, the host scans bitmaps of one or more guests to identify free memory pages. In one embodiment, each guest is a guest operating system that runs within a virtual machine. Each guest may maintain its own memory bitmap that shows the statuses of all memory pages assigned to that guest. At block 510, the host evicts one or more of the identified free memory pages from a guest. The host may evict memory pages from multiple guests, as necessary. The host may then add the memory pages to a free page list. The host may later reallocate the evicted memory pages to new processes (e.g., to new guests). The method then ends.

Figure 6A:
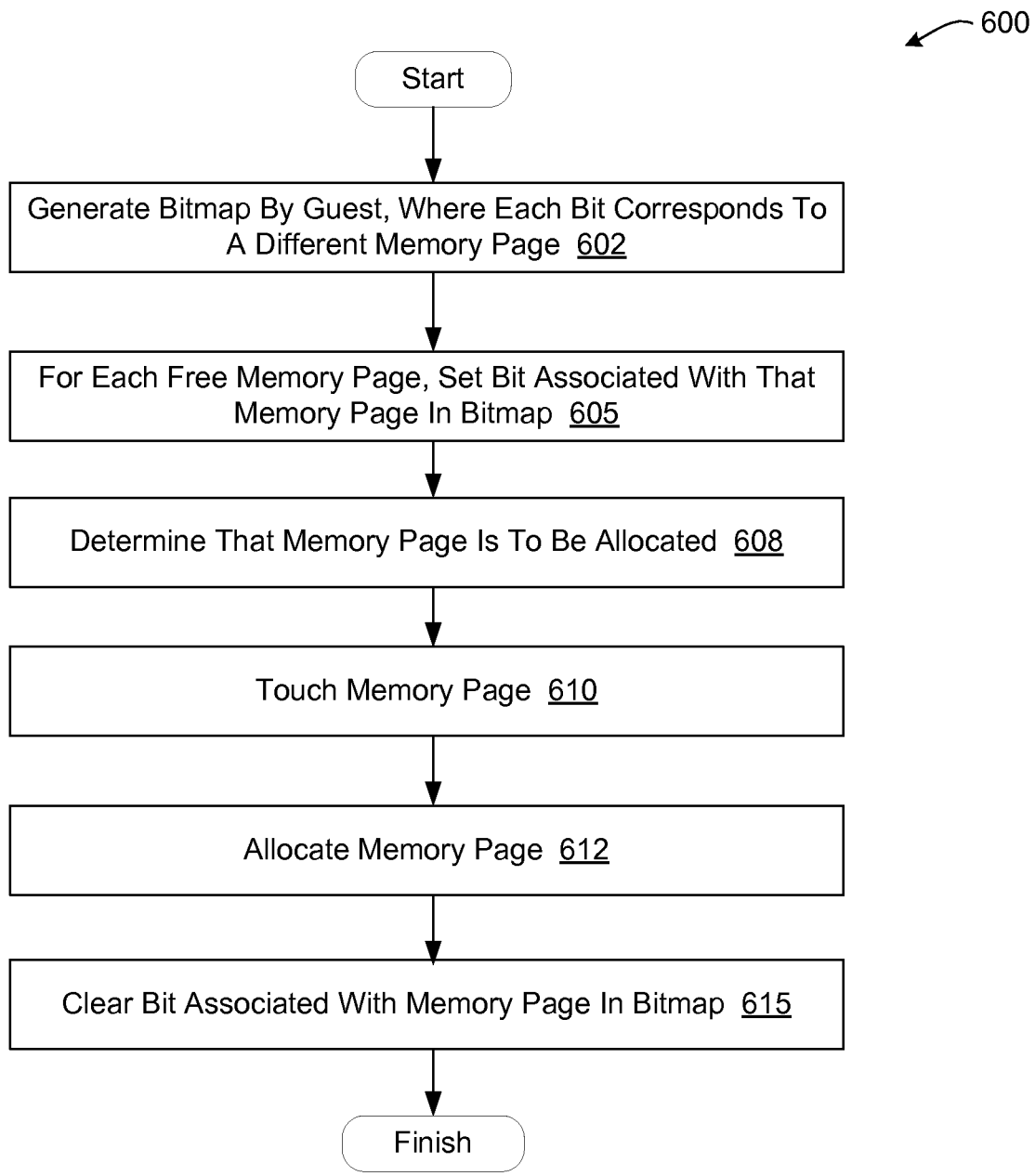
FIG. 6A is a flow diagram illustrating one embodiment of a method for maintaining a memory bitmap.

FIG. 6A is a flow diagram illustrating one embodiment of a method 600 for maintaining a memory bitmap. The method 600 may be performed by a computer system that may comprise hardware (e.g., circuitry, dedicated logic, programmable logic, microcode, etc.), software (e.g., instructions run on a processing device to perform hardware simulation), or a combination thereof. In one embodiment, the method 600 is performed by the guest memory manager 144 of FIG. 1.

Referring to FIG. 6A, at block 602 of method 600, a guest generates a bitmap. Each bit in the bitmap may correspond to a different memory page that has been allocated to the guest. At block 605, for each free memory page, the guest sets a bit in the bitmap associated with that memory page.

At block 608, the guest determines to allocate a memory page to a process. At block 610, the guest touches the memory page. If the memory page was paged out, then this will cause a page fault, which will cause the memory page to be paged back in (or the contents of the memory page to be discarded and a new memory page to be allocated by a host) before the memory page is allocated by the guest. At block 612, the guest allocates the memory page (which may be a new memory page if the memory page had been paged out and subsequently discarded).

At block 615, the guest clears a bit associated with the memory page in the bitmap. This may indicate that the memory page is no longer free. Blocks 608-615 of method 600 may repeat while the guest is active.

Figure 6B:
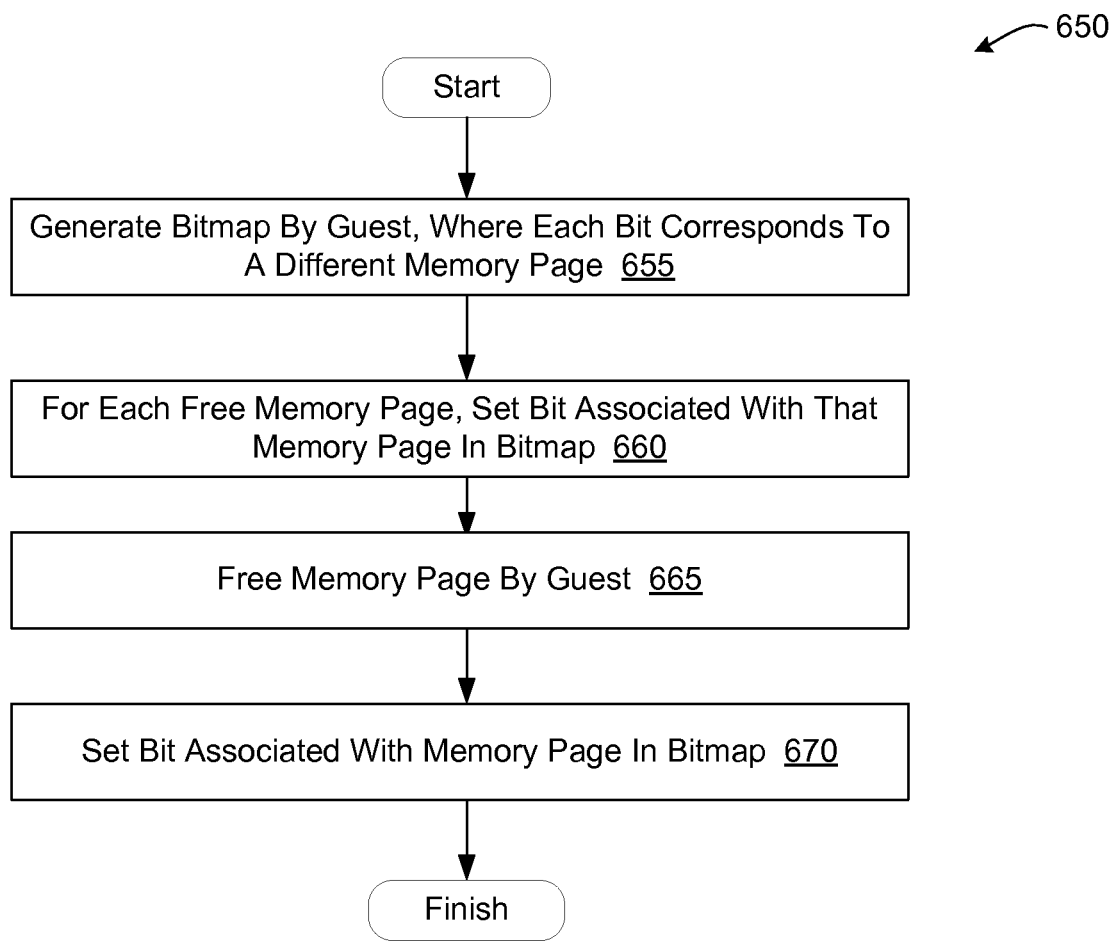
FIG. 6B is a flow diagram illustrating another embodiment of a method for maintaining a memory bitmap.

FIG. 6B is a flow diagram illustrating another embodiment of a method 650 for maintaining a memory bitmap. The method 650 may be performed by a computer system that may comprise hardware (e.g., circuitry, dedicated logic, programmable logic, microcode, etc.), software (e.g., instructions run on a processing device to perform hardware simulation), or a combination thereof. In one embodiment, the method 650 is performed by the guest memory manager 144 of FIG. 1.

Referring to FIG. 6B, at block 655 of method 650, a guest generates a bitmap. Each bit in the bitmap may correspond to a different memory page that has been allocated to the guest. At block 660, for each free memory page, the guest sets a bit in the bitmap associated with that memory page.

At block 665, the guest frees a memory page (e.g., when the process to which the memory page was allocated stops using the memory page). At block 670, the guest sets a bit associated with the memory page in the bitmap. Blocks 655-670 of method 600 may repeat while the guest is active.

Figure 7:
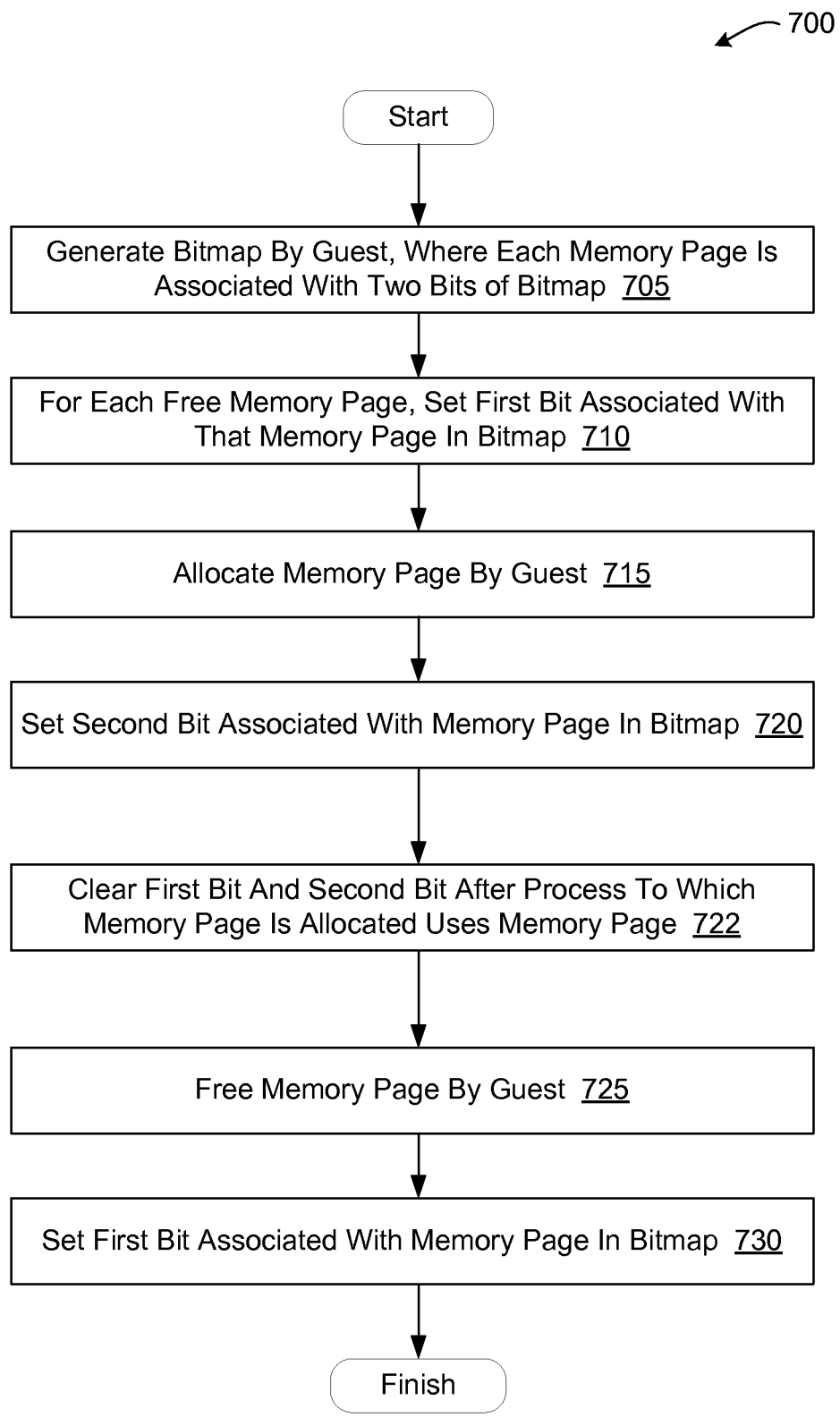
FIG. 7 is a flow diagram illustrating yet another embodiment of a method for maintaining a memory bitmap.

FIG. 7 is a flow diagram illustrating another embodiment of a method 700 for maintaining a memory bitmap. The method 700 may be performed by a computer system that may comprise hardware (e.g., circuitry, dedicated logic, programmable logic, microcode, etc.), software (e.g., instructions run on a processing device to perform hardware simulation), or a combination thereof. In one embodiment, the method 700 is performed by the guest memory manager 144 of FIG. 1.

Referring to FIG. 7, at block 705 of method 700, a guest generates a bitmap. Each memory page that has been allocated to the guest is associated with two bits in the bitmap. At block 710, for each free memory page, the guest sets a first bit in the bitmap associated with that memory page. At block 715, the guest allocates a memory page (e.g., to a process or application running on the guest). At block 720, the guest sets a second bit associated with the memory page in the bitmap. At block 722, the guest clears the first bit and the second bit associated with the memory page after a process to which the memory page was allocated uses the memory page (e.g., attempts to write to the memory page).

At block 725, the guest later frees the memory page (e.g., when the process to which the memory page was allocated stops using the memory page). At block 730, the guest sets the first bit associated with the memory page in the bitmap. Blocks 715-730 of method 700 may repeat while the guest is active.

Note that embodiments of the present invention have been described with reference to memory management for virtual machines. However, embodiments of the present invention may additionally apply to traditional processes that include garbage collection (e.g., a java virtual machine). In such embodiments, a memory manager may maintain a memory bitmap that identifies the state of all memory pages that have been allocated to a particular process (e.g., to a java virtual machine). Another memory manager may then use the state of bits in the memory bitmap when determining memory pages to evict, swap out, swap in, etc. In one embodiment, a hypercall is used to register the memory bitmap.

Note also that the above embodiments are described with just two states: stable (allocated) and unused (free). In these embodiments, a volatile memory state (wherein a guest indicates that it can tolerate the loss of memory page content, though the memory page contains data that may be useful in the future) and a potentially volatile memory state (wherein a guest indicates that it can tolerate the loss of a memory page as long as it has not been modified) may be wrapped into either the stable state or the unused state. In one embodiment, the volatile and potentially volatile memory pages are considered to be stable. In another embodiment, the volatile and potentially volatile memory pages are considered to be free. Alternatively, the volatile memory pages may be considered to be free, and the potentially volatile memory pages are considered to be stable.

Though the above embodiments have been described with just two memory page states, embodiments of the present invention may additionally apply to other memory page states such as volatile or potentially volatile. In one embodiment, a separate memory bitmap is maintained to identify memory pages that are in the volatile memory page state. Therefore, when a memory page is volatile, the guest memory manager may set a bit corresponding to that memory page in a volatile memory bitmap. When the memory page is unused, the guest memory manager may free the memory page in the volatile memory bitmap and set a bit corresponding to that memory page in an unused memory bitmap. If the memory page is stable (allocated), then the bits corresponding to that memory page in both the volatile memory bitmap and the unused memory bitmap may be unset. A similar potential volatile memory bitmap may also be maintained. Alternatively, a single memory bitmap may include multiple bits for each memory page. For example, if two bits are used, then a 00 may indicate that a memory page is stable, a 10 may indicate that the memory page is free, a 11 may indicate that the memory page is volatile, and a 01 may indicate that the memory page is potential volatile. Memory bitmaps that identify volatile and/or potential volatile memory page states may be maintained by a guest memory manager and used by a host memory manager in the same manner as described above with reference to memory bitmaps that only identify whether a memory page is free or allocated.

Figure 8:
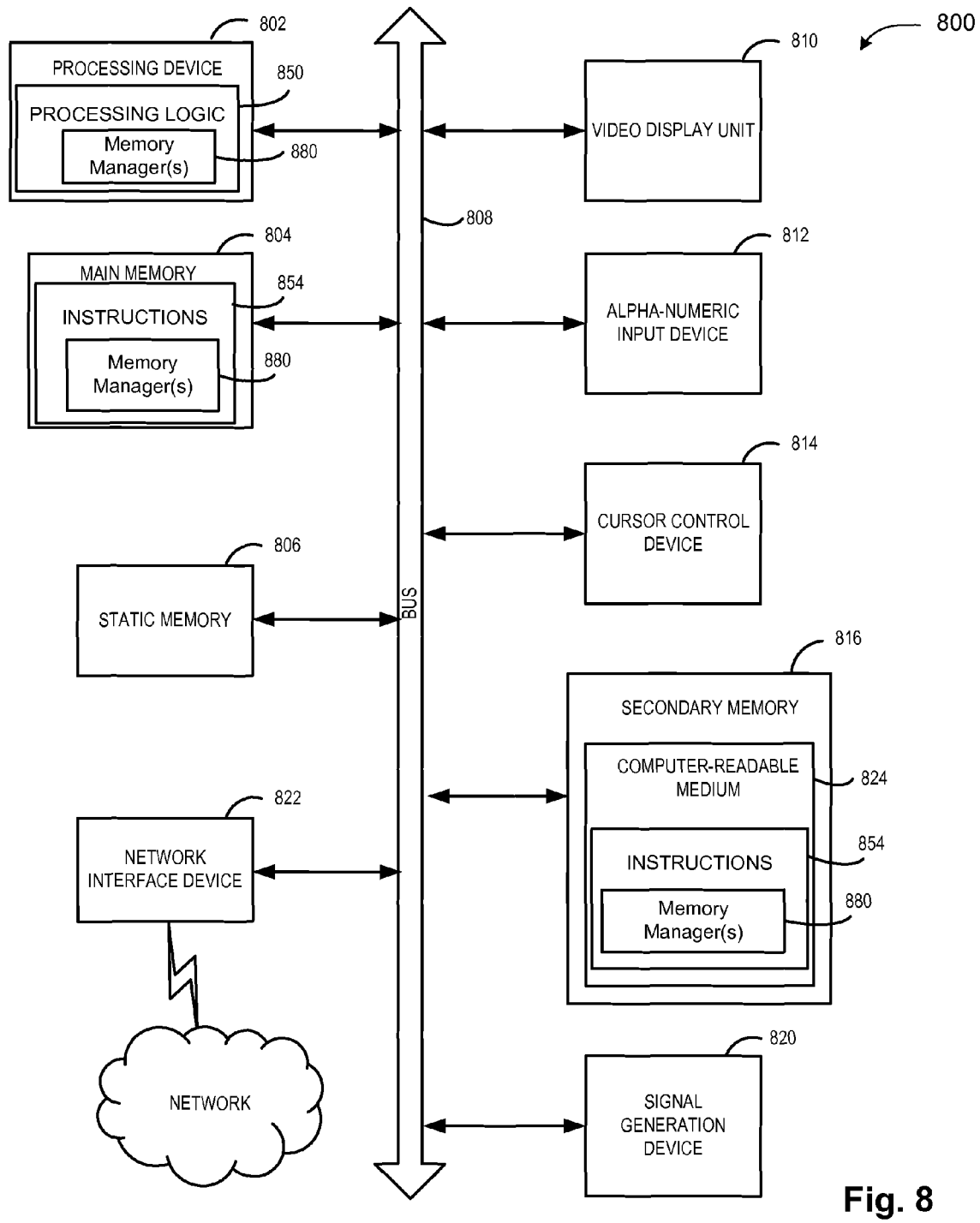
FIG. 8 illustrates a diagrammatic representation of a machine in the exemplary form of a computer system.

FIG. 8 illustrates a diagrammatic representation of a machine in the exemplary form of a computer system 800 within which a set of instructions, for causing the machine to perform any one or more of the methodologies discussed herein, may be executed. The computer system 800 may correspond to hot machine 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 816 (e.g., a data storage device), which communicate with each other via a bus 808.

The processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 802 may also be one or more special-purpose processing devices such as an application specific integrated circuit (ASIC), a field programmable gate array (FPGA), a digital signal processor (DSP), network processor, or the like.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The secondary memory 816 may include a machine-readable storage medium (or more specifically a computer-readable storage medium) 824 on which is stored one or more sets of instructions 854 embodying any one or more of the methodologies or functions described herein (e.g., memory managers 880). In one embodiment, memory managers 880 correspond to guest memory manager 144 and/or host memory manager 132 of FIG. 1. The instructions 854 may also reside, completely or at least partially, within the main memory 804 and/or within the processing device 802 during execution thereof by the computer system 800; the main memory 804 and the processing device 802 also constituting machine-readable storage media.

While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

The computer system 800 may additionally include memory management modules (not shown) for implementing the functionalities of the memory managers 880. The modules, components and other features described herein (for example in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components.

Some portions of the above described detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "selecting", "accessing", "determining", "sending", "assigning", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   selecting a memory page for eviction by a host machine that comprises a hypervisor, wherein the memory page has been allocated to a guest operating system running within a virtual machine;
   accessing, by the hypervisor, a bitmap maintained at the guest operating system by the virtual machine to determine a state of a bit in the bitmap associated with the memory page;
   determining, by the hypervisor, whether content of the memory page is to be preserved in view of the state of the bit;
   in response to determining that the content of the memory page is not to be preserved in view of the state of the bit, unmapping the memory page allocated to the guest operating system;
   verifying, by the hypervisor, that the state of the bit associated with the memory page remains unchanged during the unmapping; and
   in response to the state of the bit changing, remapping the memory page back to the guest operating system.

2. The method of claim 1, further comprising:
   in response to determining that the content of the memory page is to be preserved, storing the content of the memory page in a secondary storage.

3. The method of claim 2, further comprising:
   receiving a page fault in response to the guest operating system accessing the memory page; and
   determining whether to copy the stored content back to the memory page in view of the state of the bit.

4. The method of claim 1, further comprising:
   determining that additional memory pages are needed;
   reviewing bitmaps of a plurality of guest operating systems to identify free memory pages that have been allocated to the plurality of guest operating systems; and
   selecting one or more of the free memory pages to evict from one or more of the plurality of guest operating systems in view of contents of the bitmaps.

5. The method of claim 1, wherein the bitmap comprises two bits associated with each memory page allocated to the guest operating system, the method further comprising:
   clearing one or more bits associated with a memory page in response to receiving a page fault for the memory page, wherein the guest operating system sets at least one bit associated with the memory page in response to the memory page being allocated to a process.

6. The method of claim 1, further comprising:
receiving a page fault by the host machine executing the hypervisor in response to the guest operating system accessing the memory page allocated to the guest operating system;
accessing, by the hypervisor, the bitmap maintained at the guest operating system by the virtual machine to determine the state of the bit in the bitmap associated with the memory page;
determining, by a processing device, whether content of the memory page is to be preserved in view of the state of the bit; and
in response to determining that the content of the memory page is not to be preserved in view of the state of the bit, discarding the content of the memory page.

7. The method of claim 6, further comprising:
assigning a new memory page to the guest operating system in response to the page fault.

8. The method of claim 6, wherein the memory page has been stored in secondary storage by the host machine.

9. A non-transitory computer readable storage medium comprising instructions that, when executed by a processing, cause the processing device to:
select, by the processing device of a host machine that comprises a hypervisor, a memory page for eviction by the host machine, wherein the memory page has been allocated to a guest operating system running within a virtual machine;
access, by the processing device, a bitmap maintained at the guest operating system by the virtual machine to determine a state of a bit in the bitmap associated with the memory page;
determine, by the processing device, whether content of the memory page is to be preserved in view of the state of the bit;
in response to determining that the content of the memory page is not to be preserved in view of the state of the bit unmap the memory page allocated to the guest operating system;
verify, by the processing device, the state of the bit associated with the memory page remains unchanged during the unmapping; and
in response to the state of the bit changing, remap the memory page back to the guest operating system.

10. The non-transitory computer readable storage medium of claim 9, wherein the processing device is further to:
in response to determining that the content of the memory page is to be preserved, remove the content of the memory page from a main memory and storing the content in a secondary storage.

11. The non-transitory computer readable storage medium of claim 10, wherein the processing device is further to:
receive a page fault in response to the guest operating system accessing the memory page; and
determine whether to copy the stored content back to the memory page in view of the state of the bit.

12. The non-transitory computer readable storage medium of claim 9, wherein the processing device is further to:
determine that additional memory pages are needed;
review bitmaps of a plurality of guest operating systems to identify free memory pages that have been allocated to the plurality of guest operating systems; and
select one or more of the free memory pages to evict from one or more of the plurality of guest operating systems in view of contents of the bitmaps.

13. The non-transitory computer readable storage medium of claim 9, wherein the bitmap comprises two bits associated with each memory page allocated to the guest, wherein the processing device is further to:
clear one or more bits associated with a memory page in response to receiving a page fault for the memory page, wherein the guest operating system sets at least one bit associated with the memory page in response to the memory page being allocated to a process.

14. The non-transitory computer readable storage medium of claim 9, wherein the processing device further to:
receive, by the processing device of the host machine that comprises the hypervisor, a page fault at the host machine in response to the guest operating system accessing a memory page allocated to the guest operating system;
access, by the processing device, a bitmap maintained at the guest operating system to determine the state of the bit in the bitmap associated with the memory page;
determine whether content of the memory page is to be preserved in view of the state of the bit; and
in response to determining that the content of the memory page is not to be preserved in view of the state of the bit, discard the content of the memory page.

15. The non-transitory computer readable storage medium of claim 14, wherein the processing device is further to:
assign a new memory page to the guest operating system in response to the page fault.

16. The non-transitory computer readable storage medium of claim 14, wherein the memory page has been stored in secondary storage by the host machine.

17. An apparatus comprising:
a memory; and
a processing device, operatively coupled to the memory, to:
select a memory page for eviction, wherein the memory page has been allocated to a guest operating system running within a virtual machine managed by a hypervisor on the apparatus;
access a bitmap maintained at the guest operating system by the virtual machine to determine a state of a bit in the bitmap associated with the memory page;
determine whether content of the memory page is to be preserved in view of the state of the bit; and
in response to determining that the content of the memory page is not to be preserved in view of the state of the bit unmap the memory page allocated to the guest operating system;
verify the state of the bit associated with the memory page remains unchanged during the unmapping; and
in response to the state of the bit changing, remap the memory page back to the guest operating system.

18. The apparatus of claim 17, wherein the processing device is further to remove the content of the memory page from a main memory and store the content in a secondary storage in response to determining that the content of the memory page is to be preserved.

19. The apparatus of claim 17, wherein the processing device is further to:
determine that additional memory pages are needed;
review bitmaps of a plurality of guest operating systems to identify free memory pages that have been allocated to the plurality of guest operating systems; and
select one or more of the free memory pages to evict from one or more of the plurality of guest operating systems in view of contents of the bitmaps.

20. The apparatus of claim 17, wherein the processing device is further to:
- receive a page fault in response to the guest operating system accessing a memory page that has been swapped out to secondary storage;
- access a bitmap maintained by the guest operating system to determine a state of a bit in the bitmap associated with the memory page; and
- determine whether content of the memory page is to be preserved in view of the state of the bit.

* * * * *